United States Patent
Foertsch et al.

(10) Patent No.: US 12,088,056 B2
(45) Date of Patent: Sep. 10, 2024

(54) LASER LIGHT SOURCE AND LASER PROJECTOR WITH LASER LIGHT SOURCE

(71) Applicant: Q.ant GmbH, Stuttgart (DE)

(72) Inventors: Michael Foertsch, Stuttgart (DE); Stefan Hengesbach, Stuttgart (DE)

(73) Assignee: Q.ANT GMBH, Stuttgart (DE)

( * ) Notice: Subject to any disclaimer, the term of this patent is extended or adjusted under 35 U.S.C. 154(b) by 795 days.

(21) Appl. No.: 17/159,225

(22) Filed: Jan. 27, 2021

(65) Prior Publication Data

US 2021/0159660 A1    May 27, 2021

Related U.S. Application Data

(63) Continuation of application No. PCT/EP2019/069111, filed on Jul. 16, 2019.

(30) Foreign Application Priority Data

Jul. 27, 2018   (DE) ...................... 10 2018 212 551.1

(51) Int. Cl.
*H01S 3/108*    (2006.01)
*G03B 21/20*    (2006.01)
(Continued)

(52) U.S. Cl.
CPC ........ *H01S 3/1083* (2013.01); *G03B 21/2033* (2013.01); *H01S 3/0014* (2013.01);
(Continued)

(58) Field of Classification Search
CPC ........ H01S 3/1083; H01S 3/0014; H01S 3/04; H01S 3/0623; H01S 3/063; H01S 3/094
See application file for complete search history.

(56) References Cited

U.S. PATENT DOCUMENTS

| 4,728,168 A | * | 3/1988 | Alferness | ................ | H01S 5/146 372/18 |
| 5,117,126 A |   | 5/1992 | Geiger    |                  |                   |

(Continued)

FOREIGN PATENT DOCUMENTS

| CN | 101473251 A | 7/2009 |
| CN | 104701725 A | 6/2015 |

(Continued)

OTHER PUBLICATIONS

Tillman, et al., "Femtosecond Seeded 150 nm-bandwidth Optical Parametric Amplifier for Active Imaging Applications at 1550 nm," *Proceedings of SPIE*, Oct. 13, 2005, p. 59890R, 5989, Heriot-Watt University, Edinburgh, UK. XP055631630.

(Continued)

*Primary Examiner* — Michael Carter
(74) *Attorney, Agent, or Firm* — LEYDIG, VOIT & MAYER, LTD.

(57) ABSTRACT

A laser light source includes a nonlinear optical medium and a pump laser source configured to generate a pump laser beam to form a signal beam and an idler beam in the nonlinear optical medium by parametric down conversion. The laser light source further includes a seed light source configured to generate a seed signal beam and/or a seed idler beam having a coherence length lesser than a coherence length of the pump laser beam, and a superpositioning device configured to superposition the seed signal beam and/or the seed idler beam with the pump laser beam for joint coupling into the nonlinear optical medium.

21 Claims, 3 Drawing Sheets

(51) Int. Cl.
*H01S 3/00* (2006.01)
*H01S 3/04* (2006.01)
*H01S 3/06* (2006.01)
*H01S 3/063* (2006.01)
*H01S 3/094* (2006.01)

(52) U.S. Cl.
CPC .............. *H01S 3/04* (2013.01); *H01S 3/0623* (2013.01); *H01S 3/063* (2013.01); *H01S 3/094* (2013.01)

(56) References Cited

U.S. PATENT DOCUMENTS

| | | | |
|---|---|---|---|
| 5,197,072 A * | 3/1993 | Harada | H01S 3/109 359/328 |
| 5,663,973 A | 9/1997 | Stamm et al. | |
| 6,233,025 B1 | 5/2001 | Wallenstein | |
| 6,233,089 B1 | 5/2001 | Nebel | |
| 8,049,956 B2 | 11/2011 | Kong et al. | |
| 9,748,729 B2 | 8/2017 | Chuang et al. | |
| 2004/0042513 A1* | 3/2004 | Teich | G06N 10/00 372/22 |
| 2006/0078011 A1* | 4/2006 | Lucht | G02F 1/39 372/21 |
| 2008/0089369 A1 | 4/2008 | Luo et al. | |
| 2008/0279234 A1 | 11/2008 | Gollier et al. | |
| 2009/0016388 A1 | 1/2009 | Gu et al. | |
| 2009/0110013 A1 | 4/2009 | Gollier et al. | |
| 2009/0129413 A1 | 5/2009 | Richter | |
| 2013/0077086 A1 | 3/2013 | Chuang et al. | |
| 2016/0026066 A1 | 1/2016 | Stultz et al. | |
| 2017/0269455 A1 | 9/2017 | Kaertner et al. | |
| 2018/0259828 A1* | 9/2018 | Moqanaki | G02F 1/03 |
| 2020/0064710 A1 | 2/2020 | Brinkmann et al. | |

FOREIGN PATENT DOCUMENTS

| | | |
|---|---|---|
| DE | 102016122047 B3 | 3/2018 |
| DE | 102018116627 B3 | 6/2019 |
| EP | 2065989 A2 | 6/2009 |
| JP | H07281228 * | 10/1995 |
| JP | H 07281228 A | 10/1995 |
| JP | H 08227085 A | 9/1996 |
| JP | H 09121069 A | 5/1997 |
| JP | H 10213828 A | 8/1998 |
| JP | 2003075877 A | 3/2003 |
| JP | 2005208472 A | 8/2005 |
| JP | 2011128368 A | 6/2011 |
| JP | 2017535806 A | 11/2017 |
| TW | 200913414 A | 3/2009 |
| TW | 200915686 A | 4/2009 |
| TW | 200935688 A | 8/2009 |
| TW | 201320512 A | 5/2013 |
| WO | WO 2006105259 A2 | 10/2006 |
| WO | WO 2006129211 A2 | 12/2006 |
| WO | WO 2011050223 A1 | 4/2011 |
| WO | WO 2011071921 A2 | 6/2011 |
| WO | WO 2011146310 A1 | 11/2011 |
| WO | WO 2013034813 A2 | 3/2013 |
| WO | WO 2020011504 A1 | 1/2020 |

OTHER PUBLICATIONS

Vereshchagin, et al., "Parametric Amplification of Broadband Radiation of a CW Superluminescent Diode Under Picosecond Pumping," *Quantum Electronics*, Dec. 2016, pp. 811-814, 46, 9, Institute of Physics and Turpion, RU.

Riechert, "Speckle Reductions in Projection Systems," Jul. 2009, pp. 1-178, Universitätsverlag Karlsruhe, Karlsruhe, DE.

* cited by examiner

LASER LIGHT SOURCE AND LASER PROJECTOR WITH LASER LIGHT SOURCE

CROSS-REFERENCE TO PRIOR APPLICATIONS

This application is a continuation of International Patent Application No. PCT/EP2019/069111, filed on Jul. 16, 2019, which claims priority to German Patent Application No. DE 10 2018 212 551.1, filed on Jul. 27, 2018. The entire disclosure of both applications is hereby incorporated by reference herein.

FIELD

The present disclosure relates to a laser light source including at least one nonlinear optical medium, in particular a nonlinear crystal, as well as at least one pump laser source for generating a pump laser beam to form a signal beam and an idler beam in the nonlinear optical medium by parametric down conversion. The present disclosure further relates to a laser projector with such a laser light source.

BACKGROUND

Light sources which generate light with high intensity, colour fidelity, concentration and suitable coherence are advantageous, among other things, for visualization applications, such as for projectors. For visualization applications, especially for projectors, light sources are often used which generate incoherent light, e.g., lamps or LEDs. But such light sources have shortcomings in their intensity, colour fidelity, and beam concentration. Laser light sources are superior in all these aspects, but they emit strongly coherent light, which in the application in a laser projector results in so-called speckle noise, i.e., a granular interference effect, which substantially reduces the image quality. Speckle noise occurs not only in laser projectors, but also wherever laser light sources are used for imaging or measuring purposes, such as in interferometric measuring technology.

Different procedures are known for reducing the coherence of laser light: for example, the laser light may be subjected to an optical filtering before it is used for the projection. However, the optical filters used for this purpose generally require a significant installation space. Therefore, a number of alternative procedures have been explored in the literature to deal with the speckle issues in laser projectors. A survey is provided by the dissertation "Speckle Reduction in Projection Systems" of F. Riechert, Univ. of Karlsruhe, 2009. The aim of these methods is to superimpose speckle patterns which are independent of each other (i.e., decorrelated) in an incoherent manner (i.e., based on intensity).

In WO 2006/105259 A2 a system and a method are described for operating a multicolour laser source, having arrays with semiconductor lasers, in order to generate light with different colours. The individual emitters or semiconductor lasers of a particular array emit essentially incoherently, e.g., with different phase, in order to suppress the speckle noise. A spectral broadening of the laser radiation emitted by the semiconductor lasers can also be performed to reduce the speckle noise. A nonlinear frequency converter can be connected downstream of one or more of the arrays, converting an input frequency into an output frequency with a different colour. Such a nonlinear frequency converter may generate for example a parametric down conversion (PDC) of a green input frequency into a red output frequency. The nonlinear frequency converter may be situated inside an (external) resonator of a respective individual laser emitter or outside such a resonator. For the nonlinear frequency conversion, a nonlinear medium is required, which may be implemented for example by an optical fibre or a nonlinear crystal. The nonlinear crystal of such a laser light source is tuned to the wavelength of the pump laser beam of a respective laser emitter in such a way that a PDC process takes place in the laser-active crystal. The PDC process is based on the nonlinear interaction of the pump laser beam, which is generated by the coherent pump laser source, with the nonlinear medium. This interaction produces two new light fields, which in the present application—as is generally customary—shall be called the signal beam and the idler beam. The signal beam and the idler beam conserve the energy $\omega_P$ and the momentum $k_P$ of the pump laser beam, i.e., for the energy we have $\omega_P=\omega_S+\omega_I$, where $\omega_S$ denotes the energy of the signal beam and $\omega_I$ the energy of the idler beam. Accordingly, for the momentum $k_P$ of the pump laser beam, the momentum $k_S$ of the signal beam and the momentum $k_I$ of the idler beam we have: $k_P=k_S+k_I$.

In WO 2006/12911 A2 an optical resonator is described, which can be used as a down conversion laser for the reducing of speckle noise. For this purpose, a down conversion material can be used which shifts the radiation of the laser source toward longer wavelengths. The optical resonator amplifies the multimode operation, so that the down conversion material emits a spectrally broadened visible radiation. The optical resonator may also comprise a waveguide laser with an up conversion layer arranged between two waveguide layers.

EP 0 728 400 B1 describes a method and a device for generating at least three laser beams of different wavelength for the representing of coloured video images. In the device, the output of a pulsed laser is delivered to a medium with nonlinear optical characteristics as an excitation beam. In one example, a nonlinear crystal is arranged in an optical parametric oscillator (OPO). The OPO generates a signal beam and an idler beam which—optionally after a frequency conversion—are used together with the excitation beam for the representing of monochromatic partial images of a coloured video image. The temperature of the nonlinear crystal can be adjusted by a regulating device in order to select the wavelengths of the laser beams generated in the crystal or to stabilize the OPO. For the stabilization, the light intensity of the signal beam, the idler beam or a combination of the intensities of the two beams can be used.

WO 2011/071921 A2 describes a despeckle device, which reduces the speckles by stimulated Raman scattering in an optical fibre. In a three-colour laser projector in which red and blue light is generated by means of an OPO from green light, it is proposed to use the despeckle device only for the green light, since the red and blue light naturally have only a slight speckle noise on account of the spectral broadening in the OPO.

WO 2011/050223 A1 describes methods for operating a wavelength-converting light source for reduction of speckles, in which a pump laser beam with a fundamental wavelength is transformed in a wavelength conversion device into a wavelength-converted output laser beam. A physical property of the wavelength conversion device, such as its temperature, is altered during individual intervals whose duration is less than the integration time of an optical detector, such as the human eye.

WO 2011/146301 A1 describes an optical system having a light source, which generates a pump beam with at least two fundamental spectral peaks. From the pump beam, a sum frequency of the two spectral peaks is generated in a wavelength conversion device, so that an output beam is formed having three frequency-converted spectral peaks.

WO 2013/034813 A2 describes a device for generating a second harmonic, having a wavelength conversion device in order to transform incoming light into outgoing light with a smaller wavelength. The wavelength conversion device may have a nonlinear, periodically poled crystal, in order to increase the efficiency of the wavelength conversion. The nonlinear crystal may comprise a waveguide into which the light of a light source is coupled over a lens. The wavelength conversion device may have a diffraction grating in order to reflect a portion of the light back to the light source for the wavelength stabilization.

SUMMARY

In an embodiment, the present disclosure provides a laser light source including a nonlinear optical medium and a pump laser source configured to generate a pump laser beam to form a signal beam and an idler beam in the nonlinear optical medium by parametric down conversion. The laser light source further includes a seed light source configured to generate a seed signal beam and/or a seed idler beam having a coherence length lesser than a coherence length of the pump laser beam, and a superpositioning device configured to superposition the seed signal beam and/or the seed idler beam with the pump laser beam for joint coupling into the nonlinear optical medium.

BRIEF DESCRIPTION OF THE DRAWINGS

The subject matter of the present disclosure will be described in even greater detail below based on the exemplary figures. The present invention is not limited to the exemplary embodiments. All features described and/or illustrated herein can be used alone or combined in different combinations in embodiments. The features and advantages of various embodiments will become apparent by reading the following detailed description with reference to the attached drawings which illustrate the following.

DETAILED DESCRIPTION

Figure 1A:
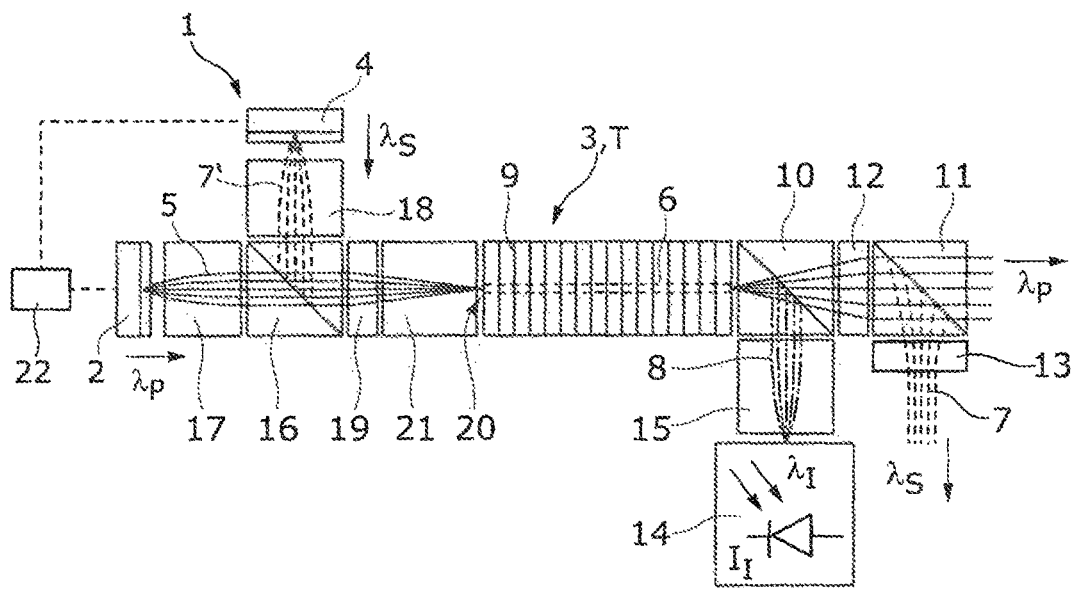
FIG. 1a provides a schematic representation of an exemplary embodiment of a laser light source with a nonlinear crystal, a pump laser source and a seed light source, wherein a pump laser beam is passed through the nonlinear crystal in a single pass, FIG. 1b provides a schematic representation of an exemplary embodiment of a laser light source analogous to FIG. 1a, wherein the pump laser beam passes through the nonlinear crystal in a double pass, FIG. 2 provides schematic representation of a laser light source analogous to FIG. 1a, having a regulating device for the temperature regulation of the nonlinear crystal arranged in an optical parametric oscillator, FIG. 3 provides a representation of a laser light source in which three nonlinear crystals are arranged in series, through which one and the same pump laser beam is passed, and FIG. 4 provides a representation of a laser light source in which three pump laser beams are passed through three nonlinear crystals in parallel.

The present disclosure provides a laser light source in which a coherence length of a signal beam and/or an idler beam formed in a nonlinear medium is adjusted or adjustable. The present disclosure further provides for utilizing the pump laser radiation of the pump laser source as efficiently as possible.

According to a first aspect, a laser light source of the above mentioned kind is provided, the laser light source further comprising at least one seed light source for generating a seed signal beam and/or a seed idler beam with lesser coherence length than the coherence length of the pump laser beam, as well as at least one superpositioning device for superpositioning of the seed signal beam and/or the seed idler beam with the pump laser beam for joint coupling into the nonlinear optical medium.

According to the first aspect, it is proposed to use at least one seed light source, which generates a seed signal beam and a seed idler beam whose emission spectrum conserves the signal wavelength of the signal beam and the idler wavelength of the idler beam or substantially agrees with them. Thanks to the use of the seed light source, the amplification of the nonlinear medium can be increased for the seed beam and/or the idler beam (population inversion). If the seed light source is an interruptible light source, the coherence or more precisely the coherence length of the laser light source according to the present disclosure can in this case be switched at least between two states (seed light source switched on or switched off).

The laser light source, which is based on the process of parametric down conversion, requires no mechanical functional components and is therefore miniaturizable. The coherence length of the generated signal beam and idler beam can be adjusted with the aid of the seed light source by coupling incoherent or partly coherent seed radiation into the nonlinear optical medium. Furthermore, thanks to the parametric down conversion, the coherence of the laser beam generated by the laser light source can be disrupted in that either only the signal beam or only the idler beam forms the useful laser beam of the laser light source. This utilizes the fact that, even though the signal beam and the idler beam have strong correlations on account of the common process of their creation in the nonlinear medium, the idler beam and the signal beam in themselves have the fluctuation behaviour of thermal light sources. These fluctuations are fast enough for the speckle noise to be almost entirely eliminated. The laser light source is therefore suited to the generating of brilliant, speckle-free projection, e.g., in data eyeglasses, in head-up displays, for the exposure of microchips in lithography and for imaging methods (for the illumination) in microscopy. The light source can also be used to generate holograms or for other optical applications on account of the adjustable coherence (see below).

The superpositioning device can be designed to superimpose the seed signal beam and/or the seed idler beam in collinear (spatial) manner, in order to deliver them along a common beam path to the nonlinear medium. For the collinear superpositioning, a dichroic beam splitter can be used for example, which is reflective for the polarization direction of the seed signal beam (or the idler signal beam) and transmissive for the polarization direction of the pump laser beam, or vice versa.

Of course, a different optical device may also be used as the superpositioning device, making possible a collinear superpositioning of the pump laser beam and the seed signal beam or the idler signal beam while utilizing at least one different property of the two beams. For example, the different wavelengths of the pump laser beam and the seed or the idler signal beam can be utilized in order to realize the superpositioning, e.g., with the help of a diffraction grating or the like.

In one advantageous embodiment, the laser light source comprises (at least) one control device for controlling the power of the seed signal beam, the seed idler beam and/or the pump laser beam coupled into the nonlinear optical medium. The control device may be designed to adjust the power of the seed light source and/or the pump laser source so as to influence or adjust in this way the coherence of the signal beam and/or the idler beam coupled out from the nonlinear medium. For the adjusting of the power of the seed signal beam and/or the seed idler beam coupled into the nonlinear medium, it is not absolutely necessary to use a seed light source with an adjustable power. Alternatively or additionally, an (optical) filtering can be done with an adjustable optical filter in order to adjust the power of the seed signal beam and/or the seed idler beam coupled into the nonlinear medium. The same holds for the adjusting of the power of the pump laser source.

In another embodiment, the seed light source is chosen from the group comprising: LED, superluminescence diode and laser diode. While a LED typically has a coherence length which is so large that the radiation emerging from the seed light source is termed incoherent, the superluminescence diode is a laser diode without a resonator. A superluminescence diode therefore combines the brightness of a laser diode with the low coherence (length) of LEDs, which is tantamount to a broader bandwidth of the radiation emitted by the superluminescence diode as compared to the laser radiation emitted by a laser diode. The seed light source in the form of the laser diode may be in particular a multi-mode laser diode. The seed signal beam or seed idler beam generated by such a multi-mode laser diode also has a lesser coherence length than a pump laser beam which is generated by a pump laser source e.g. in the form of a single-mode laser diode.

In one embodiment, to generate a pump laser beam, the pump laser source is designed with a pump wavelength of less than 460 nm. The pump wavelength of the pump laser source should not be chosen to be larger when using the laser light source for projection, since the converted output wavelengths during the parametric down conversion in the nonlinear medium are greater than the pump wavelength of the pump laser beam. With a pump wavelength being for example at 450 nm or less, for example at around 375 nm or less, the three basic colours blue (between around 420 nm and around 470 nm), green (between around 520 nm and around 540 nm) and red (between around 635 nm and 780 nm) can be generated by parametric down conversion. For the generating of three signal beams or idler beams with wavelengths in the blue, green and red wavelength range, three pump laser sources can be used, not necessarily using the same pump wavelength. The generating of three signal beams or idler beams with different wavelengths can also be done with the aid of a single pump laser source by splitting the pump laser beam on three nonlinear media. A serial generating of three signal or idler beams with different wavelengths is also possible, as described further below.

In another embodiment, the pump laser source comprises a solid state laser, especially a diode laser or a laser diode. The diode laser can be operated continuously (cw) or pulsed. In a pulsed operation of the diode laser, it is possible to select a larger injection current, which is delivered to the diode laser to generate the pump laser beam, for the individual pulses than the cw injection current, i.e., to overpulse the diode laser. In the time average, an injection current substantially corresponding to the cw injection current results during the overpulsing, on account of the pulse intermissions.

In another embodiment, the laser light source additionally comprises an optical isolator to protect the pump laser source against back reflection. The optical isolator can be for example a Faraday rotator or another kind of optical isolator, which prevents a portion of the back-reflected pump laser beam from being coupled into the pump laser source, or more precisely the diode laser.

In another embodiment, the nonlinear medium is arranged inside a resonator for a pump wavelength of the pump laser beam, in particular inside an optical parametric oscillator. The pump laser source in this case can be operated with an external resonator, the end mirror of the external resonator being arranged in the beam path of the pump laser beam behind the nonlinear optical medium. In this case, the facet of the diode laser from which the pump laser beam emerges is provided with an antireflection coating, having a reflectivity of, e.g., less than 2%, so that the back-reflected pump laser radiation is emitted in the largest possible temperature and wavelength range at the stabilized pump wavelength (locking range).

Alternatively to the use of an external resonator, a further end mirror of the resonator can be arranged in the beam path of the pump laser beam in front of the nonlinear optical medium in order to reflect back into the nonlinear optical medium the portion of the pump laser beam which is reflected at the end mirror which is arranged in the beam path of the pump laser beam behind the nonlinear optical medium. In this case, the nonlinear optical medium with the two end mirrors typically forms an optical parametric oscillator. The two end mirrors may in particular be realized in the form of highly reflective coatings on the end faces of the nonlinear optical medium in the form of a nonlinear crystal, possibly having a waveguide (see below).

The nonlinear crystal in this case forms a resonator for boosting the power of the pump laser beam. The intensity of the pump laser beam inside the nonlinear optical crystal can in this way be significantly increased and losses due to nonconverted power fractions of the pump laser beam emerging from the nonlinear crystal can be reduced. The optical parametric oscillator is typically only resonant for the pump wavelength, but not for the signal wavelength of the signal beam or for the idler wavelength of the idler beam. The two reflective coatings serving as end mirrors are thus only highly reflective for the pump wavelength, but not for the signal wavelength or for the idler wavelength.

In an alternative embodiment, the pump laser beam passes through the nonlinear medium in a single pass or in a double pass, possibly in a multiple pass, i.e., the nonlinear optical medium is not arranged inside a resonator with two end mirrors for the pump wavelength. The pump laser radiation generates during the single pass through the nonlinear optical medium an incoherent or partly coherent signal beam or idler beam. The power of a power fraction of the pump laser beam not converted into the signal beam or the idler beam during the pass through the nonlinear optical medium may possibly be further utilized, as shall be described in more detail further below. If the pump laser beam passes through the nonlinear medium in a double pass, the pump laser beam may be reflected back into the nonlinear medium for example on a coating reflective at the pump wavelength, which is deposited on one side of the nonlinear medium facing away from the pump laser source, and it will propagate back to this after the second pass, unless an optical isolator is provided to prevent this (see below).

Since photons of the signal beam are created during the second pass of the pump laser beam through the nonlinear medium, which likewise propagate in the direction toward the pump laser source or the seed light source, a reflective coating for the signal wavelength (but not for the pump wavelength) can be applied on the opposite side of the nonlinear medium. In order to be able to couple a sufficient power fraction of the seed signal beam into the nonlinear medium despite the reflective coating, the reflectivity of this reflective coating for the signal wavelength should not be chosen to be too large and it may lie for example in the region between around 50% and around 99%, especially between around 70% and around 90%. Instead of a double pass, the pump laser beam may also pass through the nonlinear medium multiple times, i.e., at least three times.

In another embodiment, the nonlinear crystal comprises a waveguide. Various methods may be used to produce a waveguide in a nonlinear crystal, such as ion implantation. The waveguide is designed such that it guides the pump laser beam at the pump wavelength, the signal beam at the signal wavelength and the idler beam at the idler wavelength with low loss in the nonlinear crystal.

In one modification, the laser light source comprises a focusing device for focusing the pump laser beam, the seed signal beam and/or the seed idler beam on an entry surface of the waveguide. The focusing device may be for example a focusing lens. A collimation device may likewise be situated in the beam path after the nonlinear medium, in order to collimate the pump laser beam, the signal beam and/or the idler beam, which typically emerge in divergent manner from the waveguide. As the lenses for the focusing and/or for the collimation, one may use for example so-called "graded index lenses" (GRIN lenses). The lenses may in particular be combined to a monolithic hybrid microsystem. GRIN lenses on account of their fabrication have a relatively small decentration and are also suitable for passive mounting in a (V) groove or on an end stop. But of course the lenses need not absolutely be GRIN lenses.

Especially when using an optical isolator it is advantageous to collimate the pump laser beam emerging from the pump laser source with the aid of a collimation device, such as a collimation lens, before it enters the optical isolator. In the event that no optical isolator is used, the function of the collimation device and the focusing device can be performed by the same lens in front of the nonlinear optical medium.

In the event that the pump laser source comprises an edge emitter with an asymmetrical beam pattern, i.e., with different divergence angles along the so-called "slow axis" (SA) and the "fast axis" (FA), as is typically the case with laser diodes, a cylindrical lens telescope or an anamorphotic collimation changing the aspect ratio can be done with the help of crossed cylindrical lenses prior to the coupling into the waveguide, in order to adapt the divergence angle or the aspect ratio to the mode diameter or the dimensions of the entry surface of the waveguide. Especially preferably there is provided an asymmetrical waveguide for this purpose having the same aspect ratio at the entry side as the transverse beam radii of the diode laser without the use of a telescope.

For the coupling of the seed signal beam and/or the seed idler beam of the seed light source into the waveguide, it is advantageous to guide them through an optical fibre or for them to emerge from an optical fibre before impinging on the superpositioning device. In particular, in this case the (mode) diameter of the exit surface of the optical fibre can be adapted to the mode diameter of the waveguide, or more precisely the entry surface of the waveguide. Alternatively, the mode field diameter of the pump light source can be adapted to the mode field diameter of the waveguide and accordingly also to the acceptance angle of the waveguide, e.g., by a diaphragm.

In one embodiment, the nonlinear crystal is periodically poled. Thanks to the periodic poling, the phase adaptation can be optimized and thus the conversion efficiency in the nonlinear medium can be increased. The periodic poling of the ferroelectric domains of the nonlinear crystal can be done during the fabrication of the nonlinear crystal, for example by means of a periodically structurized electrode.

In another embodiment, the nonlinear crystal is chosen from the group comprising: KTP (potassium titanyl phosphate), PP-KTP (periodically poled potassium titanyl phosphate), $LiNbO_3$ (lithium niobate), PP-LN (periodically poled lithium niobate), Ti:LN (titanium-lithium niobate), AlN (aluminium nitride), LNoI (lithium niobate on insulator substrate), BBO (beta-barium oxide) and LBO (lithium-barium oxide). These nonlinear crystals are transparent to wavelengths of more than roughly 380 nm. For the laser light source, a nonlinear crystal should be chosen having little absorption and thus high transparency both for the pump wavelength and for the signal wavelength and the idler wavelength.

In another embodiment, the laser light source comprises at least one beam splitter for (spatially) separating the signal beam and/or the idler beam from the pump laser beam. The at least one beam splitter is arranged in the beam path after the nonlinear optical medium. The separation of the signal beam or the idler beam from the pump laser beam can be done for example on account of the different polarization of the signal beam and the idler beam. The beam splitter may also have a wavelength-selective element in order to perform the separation of the beams on account of their different wavelength. Typically, the laser light source is designed for the emergence of the signal beam or beams from the laser light source, while the idler beam or beams do not leave the laser light source, yet in principle the reverse case is also possible. Alternatively, both the signal beam or beams and the idler beam or beams may leave the laser light source.

In another embodiment, the laser light source comprises at least one sensor device, especially a photodiode, for measuring the intensity of the signal beam and/or the idler beam. With the aid of the measured intensity, a regulating of the laser light source can be done, as is described in more detail below. As a rule, it is enough to measure the intensity of the signal beam or the idler beam. In the sense of this application, the measured intensity of the signal beam or the idler beam does not necessarily mean the overall intensity of the respective beam emerging from the nonlinear medium, but instead a quantity proportional to the overall intensity of the signal beam or the idler beam, since this likewise can be used for a regulation. In the event that the idler beam is not supposed to leave the laser light source, it has proven to be advantageous to direct the overall intensity of the idler beam at the sensor device, since in this case an absorber is not needed. The sensor device may be preceded by a wavelength filter, whose wavelength-dependent transmission is a maximum in the region of the idler wavelength (or possibly the signal wavelength) to be measured. The use of the idler beam has proven to be advantageous on account of its idler wavelength typically lying in the infrared wavelength region, since this is not suitable for visualization applications without a further wavelength conversion.

In another embodiment, the laser light source further comprises a regulating device for regulating the temperature of the nonlinear medium and/or the power of the pump laser source in dependence on the intensity of the signal beam and/or the idler beam as measured by the sensor device. As was described above, in the nonlinear medium the pump wavelength of the pump laser beam is converted into the signal wavelength and the idler wavelength. This conversion process has its maximum in a specific temperature range of the nonlinear optical medium, which lies for example in a range of values between around 20° C. and around 60° C. With the aid of the regulating device, the temperature of the nonlinear medium can be adapted, so that the efficiency of the conversion process is maximized. This is typically the case when the intensity of the idler radiation (or optionally the signal radiation) as measured by the sensor device is a maximum. The power of the pump laser source can also be regulated to optimize the efficiency of the conversion process. In the event that the nonlinear optical medium is arranged in a resonator, the resonance condition, i.e., the optical path length of the resonator, can also be adapted during the regulation so that it is optimized for the pump wavelength of the pump laser beam. For this purpose, in addition to the temperature of the nonlinear optical medium the power of the pump laser source can also be changed, since the power of the pump laser source results in a slight shifting of the pump wavelength, which may result in a wavelength stabilization. Of course, the regulating device and the above described control device can be realized as one and the same electronic component, such as a programmable electronic component.

In one modification, the laser light source comprises at least one heating and/or cooling device to regulate the temperature of the nonlinear medium. Optionally, it may be enough to perform only a heating or a cooling of the nonlinear medium. But it may also be advantageous if a temperature control, i.e., both a heating and a cooling of the nonlinear medium can be performed. The heating and/or cooling device may serve as an actuating device of the above described regulating device.

In one modification, the laser light source comprises a heating light source for radiative heating of the nonlinear optical medium. The heating light source may be, for example, an LED or another light source whose emission spectrum ideally lies in the blue or in the UV wavelength region, i.e., typically at wavelengths of less than around 380 nm or around 360 nm. The use of heating radiation with a small wavelength is advantageous to ensure that this is absorbed in the nonlinear optical medium or in the volume of the nonlinear optical crystal and converted into thermal power. As was described above, the nonlinear crystal is essentially transparent to larger wavelengths, in order to be able to transport the pump wavelength, the signal wavelength and the idler wavelength with the fewest possible losses.

In one modification, the laser light source comprises at least one heating and/or cooling device, especially a Peltier element, being in surface contact with the nonlinear medium. The heating and/or cooling device for example in the form of the Peltier element may serve for the cooling and/or the heating of the housing or the surface of the nonlinear crystal. The Peltier element or another kind of contact-type heating or cooling element can supply heat to or remove heat from the nonlinear optical medium thanks to the surface contact.

It has proven to be advantageous for the regulating of the temperature of the nonlinear medium to combine a heating and/or cooling element, being in surface contact with the nonlinear medium, with a heating light source. The heating light source may serve in particular for the fine tuning of the temperature of the nonlinear optical medium, while a coarse tuning of the temperature can be done by the heating and/or cooling element which is in surface contact with the nonlinear optical medium or with its housing.

In another embodiment, the laser light source comprises a first nonlinear optical medium to form a first signal beam and a first idler beam by parametric down conversion, a second nonlinear optical medium to form a second signal beam and a second idler beam by parametric down conversion and preferably a third nonlinear optical medium to form a third signal beam and a third idler beam by parametric down conversion.

Such a laser light source may be used for example for projection applications, since in these applications it is typically required to generate laser beams at three different wavelengths in the visible wavelength range. The three nonlinear optical media may have three pump laser beams passing through them in parallel. It is possible for a single pump laser source to generate a pump laser beam whose pump power is divided among the three nonlinear optical media. As a rule, however, it is advisable in this case to associate each nonlinear optical medium with is own pump laser source, since in this way the adjusting of the power of the signal beam and/or idler beam generated in the respective nonlinear optical medium is possible in especially simple manner by the control of the injection current. Also in this case it is possible to use different pump wavelengths for the generating of the three different wavelengths. This may be advisable if the three nonlinear optical media are supposed to generate idler radiation at the same idler wavelength, which may be advantageous for the above described regulating of the laser light source.

A further aspect relates to a laser light source as described in the introduction to the specification and which can be configured in particular as described further above in the context of the first aspect. The laser light source is designed to guide the pump laser beam from the pump laser source to the first nonlinear optical medium, to guide the pump laser beam emerging from the first nonlinear optical medium to the second nonlinear optical medium and preferably to guide the pump laser beam emerging from the second nonlinear optical medium to the third nonlinear optical medium.

According to the second aspect, the generating of the first and the second and also preferably the third signal beam as well as the respectively corresponding idler beam occurs in serial or cascading manner. In this way, a laser light source with a compact construction can be realized, while at the same time the electro-optical efficiency can be increased, since the nonconverted pump laser radiation emerging from the first or second nonlinear optical medium is coupled into a following nonlinear optical medium, in order to carry out the parametric down conversion there. In this way, in particular, the three wavelengths (e.g., red, green and blue) needed for the generating of white light, for example for projection applications, are generated in serial fashion by means of a single pump laser beam.

In this aspect, the pump laser beam passes through at least the first and the second nonlinear optical medium preferably in a single pass, in order to be able to couple a sufficient fraction of the power of the pump laser beam into a respective following nonlinear optical medium in the beam path. In this aspect, as was described above, a seed light source can be used in combination with a superpositioning device in order to couple a seed signal beam and/or a seed idler beam into the respective nonlinear optical medium. The amplification of the respective nonlinear optical medium can be influenced by the power of the respective seed light source. In this way, the intensity of the respective colour or wavelength fraction of the signal beam and/or idler beam emerging from the respective nonlinear optical medium can be adjusted.

For the adjusting of the coherence, optionally it is possible for no seed signal to be supplied to the respective nonlinear optical medium, i.e., a corresponding entry port for the seed beam remains unoccupied, or a partly coherent seed signal beam or seed idler beam may be supplied to the respective nonlinear medium by means of a seed light source in the form of an LED, a superluminescence diode or the like. In particular, in this aspect one may use, instead of a seed light source having a lesser coherence length than the pump laser source, also a seed laser source such as a laser diode generating a coherent seed signal beam or a coherent seed idler beam. Also in this case, the coherence of the laser light source can be adjusted via the power of the seed signal beam and/or the seed idler beam coupled into the nonlinear optical medium.

In the second aspect it is optionally possible to completely do without any seed light source and corresponding superpositioning device: also in the event that the seed light source is switched off or is not present, a signal beam and an idler beam are generated in the nonlinear optical medium up to a system-specific pump threshold intensity, the beams having in themselves the fluctuation behaviour of a thermal light source, so that the speckle noise for example in projection applications can be almost totally eliminated by using either the signal beam or the idler beam.

In the serial arrangement of the nonlinear optical media it has proven to be advisable to generate in the first nonlinear optical medium a signal beam in the blue wavelength region (between around 420 nm and 470 nm), in the second nonlinear optical medium a signal beam in the green wavelength region (between around 520 nm and around 540 nm), and in the third nonlinear optical medium a signal beam in the red wavelength region (between around 635 nm and around 780 nm), since the conversion efficiency diminishes with increasing wavelength.

Both in the serial generating and also in the above described parallel generating, either a respective signal beam or a respective idler beam which is generated in one of the three nonlinear optical media can be superimposed with at least two, preferably with three wavelengths in at least one superpositioning device to form a common laser beam emerging from the laser light source. The three wavelengths (red, green and blue) and their individual optical powers, which are superimposed to form the emerging laser beam, are ideally chosen such that they yield in total a white tone suitable for projection purposes, ideally a white tone with 6500 K colour temperature. For this purpose, it is necessary to select the nonlinear optical media suitably or to suitably design the length of the nonlinear optical media and their periodic poling in order to generate the desired wavelengths.

A further aspect relates to a laser projector, comprising a laser light source configured as described above. The laser light source, described further above, in which either the signal beam emerging from a respective nonlinear optical medium or the emerging idler beam is superimposed with the aid of at least one superpositioning device in order to generate a laser beam with three different wavelengths, typically lying in the visible wavelength range, can be used for example in a laser projector in order to create an approximately speckle-free image on a projection surface. For the generating of the image on the projection surface, the laser projector may have a scanner device for the two-dimensional deflecting of the laser beam, which may comprise for example at least one mirror. Such a laser projector can be used in particular as a head-up display in a motor vehicle, where for example the front windscreen serves as the projection surface. But the laser light source may also serve as an illumination source for the projection of images generated with the use of spatially resolving modulators, such as so-called DMDs (Digital Mirror Devices) or SLMs (Spatial Light Modulators).

In the following description of the drawings, identical reference numbers will be used for the same or functionally equivalent components.

FIG. 1a shows highly schematically an exemplary layout of a laser light source 1, having a pump laser source 2 in the form of a diode laser, a nonlinear optical medium in the form of a nonlinear optical crystal 3 and a seed light source 4. In the example shown, the pump laser source 2 is designed to generate a pump laser beam 5 with a pump wavelength $\lambda_P$ of 375 nm or greater than 375 nm. For visualization applications making use of a parametric down conversion (PDC) process, the pump wavelength $\lambda_P$ should not be chosen to be too large and it should be less than around 460 nm or around 450 nm.

The pump laser beam 5 is coupled into the nonlinear crystal 3, more precisely, into a waveguide 6 formed there. The waveguide 6 may be generated in the nonlinear crystal 3 for example by ion implantation or diffused-in titanium. The nonlinear crystal 3 in the example shown is periodically poled lithium niobate with diffused-in titanium (Ti:PPLn). It is essential for the selection of a nonlinear crystal 3 that a PDC process can occur in the nonlinear crystal. During the PDC process, the pump laser beam 5 enters into an interaction with the nonlinear crystal 3, whereby two new light fields are generated, designated as the signal beam 7 with a signal wavelength $\lambda_S$ and the idler beam 8 with an idler wavelength $\lambda_I$. The energy $\omega_P$ of the pump laser beam 5 is conserved during the PDC process, i.e., the law of energy conservation holds: $\omega_P=\omega_S+\omega_I$, where $\omega_S$ is the energy of the signal beam 7 and $\omega_I$ is the energy of the idler beam 8. In order to also fulfil the law of momentum conservation $k_P=k_S+k_I$ for the momentum $k_P$ of the pump laser beam 5, the momentum $k_S$ of the signal beam 7 and the momentum $k_I$ of the idler beam 8, a phase adaptation is required, which is achieved in the example shown by a periodic poling 9 of the nonlinear crystal 3. The periodic poling 9 is indicated in FIG. 1a by vertical strokes, forming the boundary surfaces between the reverse-poled ferroelectric domains of the nonlinear crystal 3. Thanks to the periodic poling 9, the nonlinearity of the crystal 3 and thus the efficiency of the PDC process is also enhanced.

In the beam path after the nonlinear crystal 3 there is arranged a first beam splitter 10, which separates the idler beam 8 from the pump laser beam 5 not converted during the PDC process and emerging from the nonlinear crystal 3. The first beam splitter 10 is configured as a dichroic beam splitter, i.e., it has a wavelength-selective element in the form of a wavelength-selective coating in order to separate the pump laser beam 5 with the pump wavelength $\lambda_P$ from the idler beam 8 with the idler wavelength $\lambda_I$. In the beam path after the first beam splitter 10 there is arranged a second beam splitter 11, which separates the pump laser beam 5 from the signal beam 7. The second beam splitter 11 is configured as a polarization beam splitter. Separation of the signal beam 7 and the idler beam 8 in a polarization beam splitter 11 is possible because the two beams in the presently chosen layout of the laser light source 1 are polarized perpendicular to each other, i.e., a phase adaptation of type II is present. Alternatively, a phase adaptation can also be realized in which the signal beam 7 and the idler beam 8 have the same polarization (type I). In both cases (type I and type II), the beam splitter may also be configured as an optical filter or a wavelength-selective optical element.

For the separation of the signal beam 7 from the pump laser beam 5 in the polarization beam splitter 11 it is advisable for the two beams 5, 7 to enter the polarization beam splitter 11 in a collimated manner. In order to accomplish this, a collimation lens 12 is arranged between the first beam splitter 10 and the second beam splitter 11. The signal beam 7 after the second beam splitter 11 is coupled out from the laser light source 1 as the useful beam via a further collimation lens 13. In place of the further collimation lens 13, the light source 1 may also have an exit window, for example if the signal beam 7 as the useful beam is already collimated by a corresponding design of the collimation lens 12. In the example shown in FIG. 1*a*, the collimation lens 12 serves for the collimation of the pump laser beam 5, but not for the collimation of the signal beam 7—on account of the different wavelengths. The signal beam 7 is collimated only by the further collimation lens 13. Of course, the reverse case is also possible.

The idler beam 8 impinges on a sensor device 14 in the form of a photodiode, which measures the intensity $I_I$ of the idler beam 8. The idler beam 8 is focused by means of a further focusing lens 15 on the photodiode 14. The measured intensity $I_I$ of the idler beam 8 can be used to regulate the temperature T of the nonlinear crystal 3, as described in more detail further below. The pump laser beam 5 passes through the nonlinear crystal 3 in a single pass. The fraction of the pump laser beam 5 not converted in the nonlinear crystal 3 can be used further, as is likewise described in more detail further below.

The laser light source 1 shown in FIG. 1*a* has a seed light source 4 in the form of an LED, which is designed to generate a seed signal beam 7'. The seed light source 4 generates a seed signal beam 7' whose wavelength matches the signal wavelength $\lambda_S$ of the signal beam 7. The seed light source 4 in the form of the LED generates the seed signal beam 7' with a coherence length which is less than the coherence length of the pump laser beam 5 generated by the pump laser source 2. Instead of an LED, a different kind of seed light source 4 may also be used, generating a partly coherent seed signal beam 7', such as a superluminescence diode or a (multimode) laser diode, for example a multimode laser diode. The seed signal beam 7' is superimposed in collinear manner with the pump laser beam 5 in a superpositioning device 16 in the form of a dichroic mirror. This utilizes the fact that the pump laser source 2 generates the pump laser beam 5 with a (linear) polarization that is oriented perpendicular to the (linear) polarization of the seed signal beam 7'.

For the superpositioning in the superpositioning device 16 it is advisable to collimate the pump laser beam 5 and the seed signal beam 7'. For the collimation of the pump laser beam 5 emerging divergently from the pump laser source 2, the laser light source 1 has a collimation lens 17. Accordingly, a further collimation lens 18 is also arranged between the seed light source 4 and the superpositioning device 16 for the collimation of the seed signal beam 7'. The superimposed pump laser beam 5 and the seed signal beam 7' are focused by means of a focusing lens 19 on an entry surface 20 of the waveguide 6. Depending on the application, a plurality of lenses, especially (crossed) cylindrical lenses, may also act jointly as the collimation lens 17. This is advisable in order to form the angle profile and/or the aspect ratio of the pump laser beam 5 emerging with two different divergence angles from the pump laser source 2 in the form of an edge emitter (laser diode) in suitable manner.

The focusing lens 19 is designed such that the pump laser beam 5 and the seed signal beam 7' jointly entering the waveguide 6 are adapted to the mode field diameter of the waveguide 6. The acceptance angle of the waveguide 6 can be adapted by a joint guidance of the pump laser beam 5 and the seed signal beam 7' in a spacer 21, for example in the form of an optical fibre. The focusing lens 19 and the spacer 21 may also be realized in the form of a single optical component, for example in the form of a GRIN lens. Alternatively or additionally, the adapting to the mode field diameter or to the acceptance angle of the waveguide 6 can be done in another way, for example, by the use of a diaphragm or the like.

For certain applications, such as holography, it may be advisable for the laser light source 1 to have a switchable or adjustable coherence (length). For the adjustment of the coherence length of the signal beam 7 used as the useful laser beam, the laser light source 1 shown in FIG. 1*a* has a control device 22. The control device 22 makes it possible to adjust the intensity of the seed signal beam 7' coupled into the nonlinear crystal 3 by controlling the injection current supplied to the seed light source 4 for the generating of the seed signal beam 7'. With increasing power or intensity of the seed signal beam 7', the coherence of the signal beam 7 generated in the nonlinear crystal 3 diminishes. Thus, by controlling the intensity of the seed signal beam 7' or the power of the seed light source 4, a desired coherence can be adjusted for the signal beam 7 emerging from the laser light source 1.

The control device 22 is also designed to adjust the power of the pump laser source 2. This may be advisable for example in projection applications in which a plurality of signal beams 7 are superimposed, since in this case the colour of the light generated by the superpositioning can be changed by changing the intensity of a respective signal beam 7. The pump laser source 2 may be operated continuously or in a pulsed manner. In the latter case, an overpulsing may occur, i.e. the (maximum) power of the pump laser source 2 is chosen to be larger during the pulse duration than that during continuous operation of the pump laser source 2. The efficiency of the PDC process in the nonlinear crystal 3 can be enhanced by the overpulsing of the pump laser source 2.

Figure 1B:
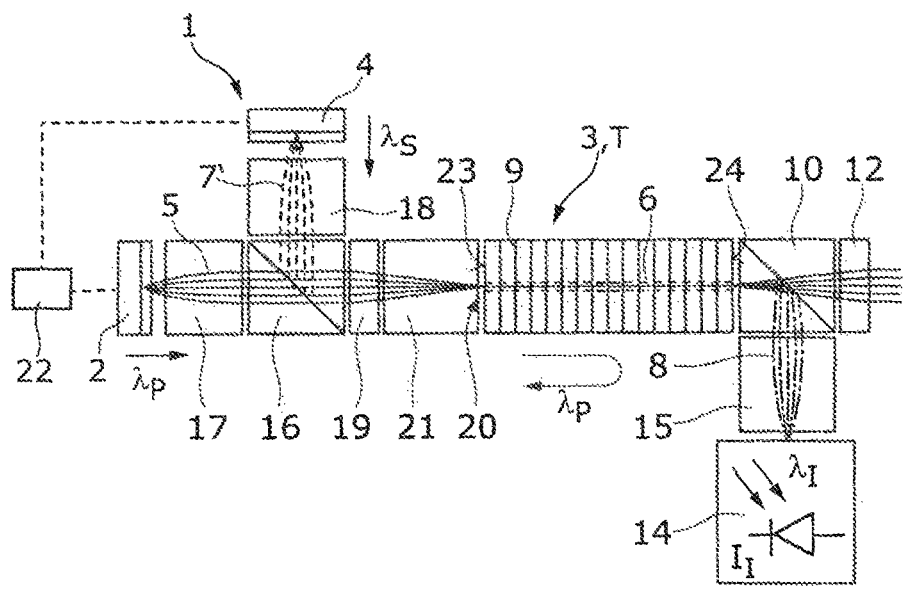

FIG. 1*b* shows a laser light source 1 which differs from the laser light source 1 shown in FIG. 1*a* essentially in that a first and second reflective coating 23, 24 are deposited on the end facets of the nonlinear crystal 3. The second reflective coating 24 on the end facet facing away from the pump laser source 2 is highly reflective (reflectivity >99%) for the pump wavelength $\lambda_P$ and it has an extremely low reflectivity (e.g., <1%) for the signal wavelength $\lambda_S$. Therefore, the pump radiation not converted is reflected back into the nonlinear crystal 3 at the second reflective coating 24 and is available for further wavelength conversion by the PDC process. The unconverted fraction of the pump laser beam 5, which is reflected back in the direction of the pump laser source 2 and passes through the nonlinear crystal 3 in a second pass, also generates photons of the signal beam 7 during the PDC process, which likewise propagate in the direction toward the pump laser source 2. In order to reverse the propagation direction of these photons once more, the first reflective coating 23 is deposited on the end facet facing toward the pump laser source 2, the coating having a large reflectivity (reflectivity e.g. between around 50% and around 99%, such as around 85%) for the signal wavelength $\lambda_S$. The reflectivity of the first reflective coating 23 should be chosen such that on the one hand a majority of the power of the fraction of the signal beam 7 propagating in the direction of the pump laser source 2 is reflected at the first reflective coating 23 and on the other hand a sufficient intensity of the seed signal laser beam 7' for a speckle-free signal beam 7 is coupled into the nonlinear crystal 3.

This utilizes the fact that the intensity or the power of the seed signal beam 7' which is coupled into the nonlinear crystal 3 should be relatively low, or else the coherence of the signal beam 7 might be increased by stimulated effects. Because of the low power of the seed signal beam 7', coupling losses during the passage of the seed signal beam 7' through the first reflective coating 23 are not significant to the overall efficiency of the laser light source 1. In the event that the first reflective coating 23 has a reflectivity of around 95% for the seed or for the signal wavelength $\lambda_S$, given a power of around 1 mW of the seed light source 4, around 50 μW will be coupled into the nonlinear crystal 3, so that a (tolerable) loss power of around 950 μW will be generated. Alternatively to the use of a first reflective coating 23 with a relatively low reflectivity, a boosting resonator could also be used, but in this case the phase condition between the length of the nonlinear optical crystal 3 and the signal beam 7 must be observed precisely, which could only be realized in a technically intricate manner.

In the laser source 1 represented in FIG. 1*b*, the second beam splitter 11 is not needed, since the power fraction of the pump laser beam 5 which is not reflected at the second reflective coating 24 of the nonlinear optical crystal 3 and which emerges from it is extremely small.

Figure 2:
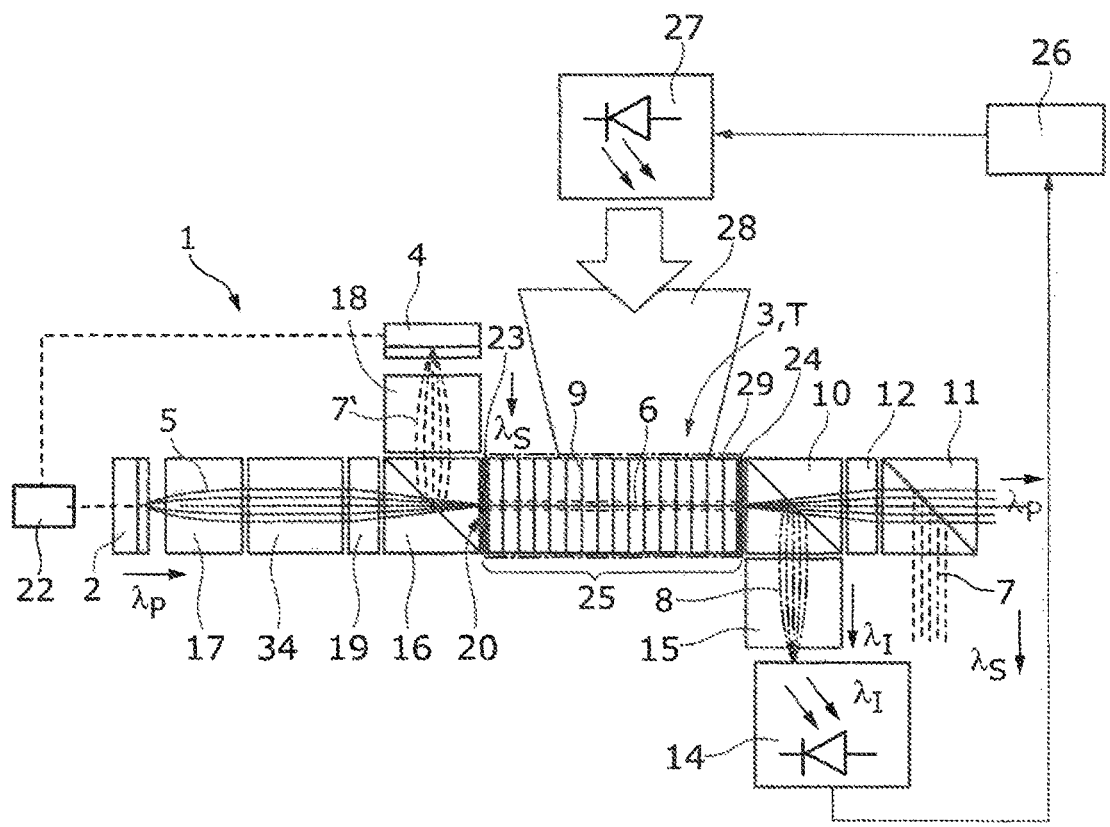

FIG. 2 shows a laser light source 1 which is designed substantially like the laser light source 1 of FIG. 1*a*, but which differs from the laser light source 1 shown in FIG. 1*a* in that the nonlinear crystal 3 is arranged in a resonator 25 (optical parametric oscillator, OPO), which is formed between a first end mirror 23 and a second end mirror 24. The two end mirrors 23, 24 in the example shown are configured in the form of highly reflective coatings, which are placed on the two end facets of the nonlinear crystal 3. The two end mirrors 23, 24 are highly reflective for the pump wavelength $\lambda_P$, in order to ensure that only the smallest possible fraction of the pump laser beam 5 is coupled out from the nonlinear crystal 3. However, the two end mirrors 23, 24 have a low reflectivity for the signal wavelength $\lambda_S$ and the idler wavelength $\lambda_I$.

Since the first end mirror 23 does not fully reflect the fraction of the pump laser beam 5 reflected back at the second end mirror 24, this can get back to the pump laser source 2 and enter it in undesirable manner. In order to prevent this, an optical isolator 34 is arranged in the laser light source 1 shown in FIG. 2, which is situated between the collimation lens 17 for the pump laser beam 5 and the focusing lens 19. The optical isolator 34 in the example shown is a Faraday rotator, but it is also possible to use another kind of optical isolator 34 for this purpose.

As can likewise been seen in FIG. 2, the laser light source 1 comprises a regulating device 26 for regulating the temperature T of the nonlinear crystal 3. The regulating device 26 receives the intensity $I_I$ of the idler beam 8 measured by the sensor device 14 as a measured variable. The regulating device 26 serves in the example shown for maximizing the measured intensity $I_I$ of the idler beam 8, since this comes down to a maximizing of the efficiency or effectiveness of the PDC process (for given power of the pump laser beam 5). The actuating element of the regulating device 26 in the example shown in FIG. 2 is a heating light source 27 in the form of an LED. The heating light source 27 generates heating radiation 28, which is radiated onto the nonlinear crystal 3 and absorbed in the volume of the nonlinear crystal 3. In order to generate the largest possible absorption of heating radiation 28 in the material of the nonlinear crystal 3, it is advisable for the heating light source 27 to generate the heating radiation at heating wavelengths which are ideally less than the pump wavelength $\lambda_P$ of the pump laser source 2. For example, the heating light source 27 may be designed to generate heating radiation 28 at wavelengths of less than around 450 nm or 380 nm.

In addition to the heating light source 27, the laser light source 1 of FIG. 2 also comprises a heating and cooling device in the form of a Peltier element 29, which is in surface contact with the nonlinear crystal 3 and likewise serves as an actuating element for the regulating device 26. The Peltier element 29 in the example shown covers the surface of the two opposite flat sides of the nonlinear crystal 3 and may serve for the cooling and/or heating of the crystal 3. Of course, alternatively to a heating and cooling device in the form of a Peltier element 29, it is also possible to use a device which is in surface contact with the nonlinear crystal 3 and which enables only a heating of the nonlinear crystal 3 or only a cooling of the nonlinear crystal 3. Also of course it is possible to use other devices not otherwise described here for the heating and/or cooling of the nonlinear crystal 3. The temperature T of the nonlinear crystal 3 should be regulated with the aid of the regulating device 26 to a value which is approximately between around 20° C. and around 60° C. The heating light source 27 in this case enables a rapid, typically slight change in the temperature T of the nonlinear crystal 3, while the rather slow Peltier element 29 enables a relatively slow adaptation of the temperature T over a relatively large temperature range.

In addition to regulating the temperature T of the nonlinear crystal 3, the regulating device 26 may also serve for regulating the power of the pump laser source 2 in order to optimize the efficiency of the conversion process. In the example shown in FIG. 2, in which the nonlinear crystal 3 is arranged in a resonator 25, the resonance condition, i.e., the optical path length of the resonator 25, can also be adapted during the regulation, so that this is optimized for the pump wavelength $\lambda_P$ of the pump laser beam 5. For this purpose, in addition to the temperature T of the nonlinear crystal 3 the power or the intensity of the pump laser beam 5 of the pump laser source 2 can also be changed.

The regulating device 26 for this purpose may make use of the control device 22. Of course, the control device 22 and the regulating device 26 can be realized as one and the same electronic component, such as a programmable electronic component.

A stabilization of the pump wavelength $\lambda_P$ is also possible in the example of the laser light source 1 shown in FIG. 1*a*, for example by incorporating the nonlinear crystal 3 in an external resonator of the pump light source 2 in the form of the diode laser. In this case, a portion of the pump laser beam 5 can be reflected back into the pump light source 2 by an end mirror (not shown) of the external resonator and be used there for the wavelength stabilization.

Figure 3:
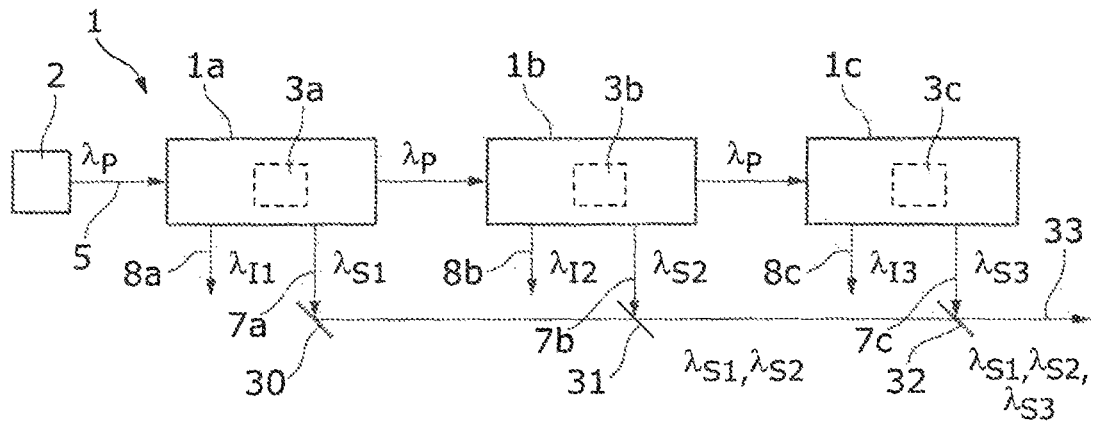

FIG. 3 shows a laser light source 1 having a pump laser source 2 for generating a pump laser beam 5 and three laser modules 1*a-c* which are arranged in series. Each of the three laser modules 1*a-c* is designed substantially like the laser light source 1 of FIG. 1*a*, except for the fact that they have no pump laser source 2. The first laser module 1*a* receives the pump laser beam 5 from the pump laser source 2 in order to generate in a first nonlinear crystal 3a, by a PDC process, a first signal beam 7a with a first signal wavelength $\lambda_{S1}$ and a first idler beam 8a with a first idler wavelength $\lambda_{I1}$. The portion of the pump laser beam 5 not converted in the first nonlinear crystal 3a of the first laser module 1a leaves the first laser module 1a and is provided to the second laser module 1b, which has a second nonlinear crystal 3b. In the second nonlinear crystal 3b, a second signal beam 7b with a second signal wavelength $\lambda_{S2}$ and a second idler beam 8b with a second idler wavelength $\lambda_{I2}$ are generated from the pump laser beam 5. The portion of the pump laser beam 5 not converted in the second nonlinear crystal 3b is taken to the third laser module 1c. The third laser module 1c has a third nonlinear crystal 3c, in which the pump laser beam 5 generates by a PDC process a third signal beam 7c with a third signal wavelength $\lambda_{S3}$ and a third idler beam 8c with a third idler wavelength $\lambda_{I3}$.

The serial arrangement of the laser modules 1a-c and the nonlinear crystals 3a-c utilizes the fact that the pump laser beam 3a-c passes through at least the first and the second nonlinear crystal 3a, 3b, typically also the third nonlinear crystal 3c, in a single pass, i.e., these are not arranged in a resonator or an optical parametric oscillator.

The laser modules 1a-c as in the laser light source 1 shown in FIG. 1a, b may comprise a seed light source, but this is not absolutely necessary, i.e., a seed light source may be omitted. Alternatively, a respective seed light source may be used in the three laser modules 3a-c in the form of a coherent seed light source, such as a laser diode or the like. The control or the regulation can be done similar to the examples shown in FIG. 1a, b and FIG. 2.

The laser light source 1 shown in FIG. 3 is designed for projection applications and it generates the three signal beams 7a-c at three different signal wavelengths $\lambda_{S1}$, $\lambda_{S2}$, $\lambda_{S3}$, each of them lying in the visible wavelength region. The pump wavelength $\lambda_P$ in the example shown in FIG. 3 lies at around 375 nm, the first signal wavelength $\lambda_{S1}$ at around 480 nm and the first idler wavelength $\lambda_{I1}$ at around 1714 nm. The second signal wavelength $\lambda_{S2}$ lies at around 530 nm and the second idler wavelength $\lambda_{I2}$ lies at around 1282 nm. Accordingly, the third signal wavelength $\lambda_{S3}$ lies at around 650 nm and the third idler wavelength $\lambda_{I3}$ lies at around 886 nm. The three signal wavelengths $\lambda_{S1}$, $\lambda_{S2}$, $\lambda_{S3}$ of the three signal beams 7a-c thus lie in the blue, in the green and in the red spectral region. For the use of the three signal beams 7a-c in a laser projector (not shown), the laser light source 1 comprises a first and second superpositioning device 31, 32 for the spatial, collinear superpositioning of the three signal beams 7a-c. The first signal beam 7a emerging from the first laser module 1a is deflected for this purpose at a deflection mirror 30 toward the first superpositioning device 31, having a wavelength-selective element, in order to superimpose in collinear manner the first and the second signal beam 7a, 7b. The superimposed first and second signal beams 7a, 7b impinge on the second superpositioning device 32, which likewise has a wavelength-selective element, in order to superimpose them spatially with the third signal beam 7c, so that a laser beam 33 is formed having all three signal wavelengths $\lambda_{S1}$, $\lambda_{S2}$, $\lambda_{S3}$.

The laser beam 33 generated by the laser light source 1 may be provided for example to a scanner device of a laser projector, in order to deflect the laser beam 33 in two dimensions to generate an image on a projection surface. In order to adjust the power fractions of the three signal beams 7a-c and thus the colour of the laser beam 33, the power of the seed laser source can be adjusted or changed in the respective laser modules 1a-c. The three idler beams 8a-c emerging from the laser modules 1a-c, as described above, can be used to regulate the temperature T of a respective nonlinear optical crystal 3a-c. Different types of nonlinear crystals 3a-c can be used to generate different signal wavelengths $\lambda_{S1}$, $\lambda_{S2}$, $\lambda_{S3}$. But as a rule it is enough to select a different periodic poling of the nonlinear crystals 3a-c for this purpose.

Figure 4:
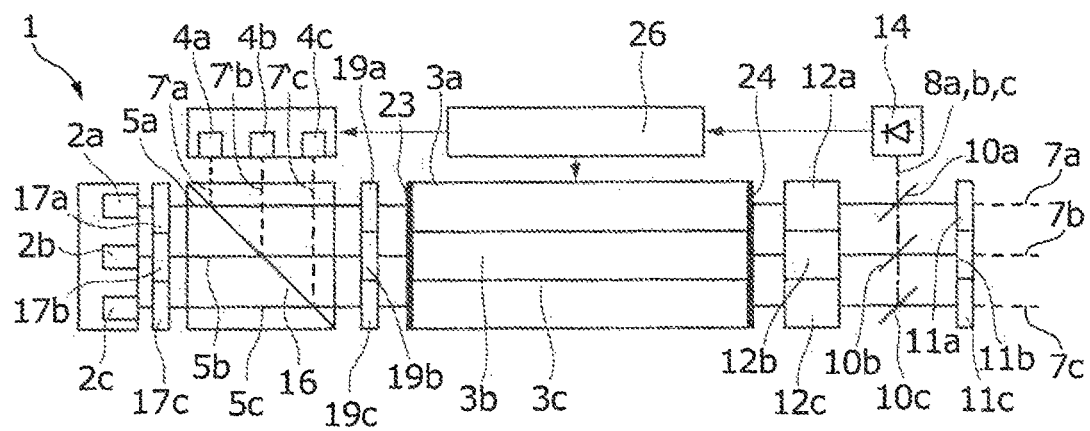

FIG. 4 shows a laser light source 1 which is likewise designed for projection applications and which differs from the laser light source 1 shown in FIG. 3 basically in that a pump laser beam 5 does not pass in series through the three nonlinear crystals 3a-c, but instead three pump laser beams 5a-c pass through them in parallel, being generated by three pump laser sources 2a-c. The laser source 1 shown in FIG. 4 is built substantially like the laser source 1 shown in FIG. 2 and differs from it by the use of three parallel beam paths instead of a single beam path.

The laser source 1 of FIG. 4 therefore comprises three collimation devices 17a-c for the collimation of a respective pump laser beam 5a-c before entering a superpositioning device 16, which superimposes one seed signal beam 7'a to 7'c generated by a respective seed light source 4a-c with a respective pump laser beam 5a-c. The seed signal beams 7'a to 7'c and the pump laser beams 5a-c superimposed in the superpositioning device 16 are focused by means of a respective focusing lens 19a-c and coupled into one of the three nonlinear crystals 3a-c arranged in parallel, more precisely, into a respective (not depicted) waveguide. The idler beams 8a-c emerging from the three nonlinear crystals 3a-c, after another collimation with the aid of three collimation lenses 12a-c, are separated at a respective first beam splitter 10a-c from the signal beam 7a-c and the respective pump laser beam 5a-c.

The three idler beams 8a-c in the example shown in FIG. 4 are guided jointly onto a single sensor device 14, in order to measure the intensity $I_I$ of the three idler beams 8a-c. The pump light sources 2a-c may be designed with different pump wavelengths $\lambda_P$ for the generating of pump laser beams 5a-c (for example, 373.5 nm, 394.5 nm and 358 nm). This is utilized in the example shown in order to generate the same idler wavelength $\lambda_I$ (such as 1550 nm) in all three nonlinear crystals 3a-c, which is advantageous for the above described joint measuring of the intensity $I_I$ of the idler beams 8a-c.

As in the case of the laser light source 1 represented in FIG. 2, a regulating device 26 also serves in the laser light source 1 shown in FIG. 4 for the regulating of the temperature T of the nonlinear crystals 3a-c. In the example shown, the three nonlinear crystals 3a-c are fabricated as a monolithic block, i.e., they differ substantially only in the periodic poling. Therefore, it may be advisable to regulate the temperature T in the three nonlinear crystals 3a-c not individually, but jointly for all three nonlinear crystals 3a-c. For this purpose, it is enough to measure merely the total intensity $I_I$ of all three idler beams 8a-c or possibly that of a single idler beam 8a-c. Of course, however, alternatively to the procedure shown in FIG. 4, it is also possible to measure individually the intensities of all three idler beams 8a-c with the aid of three sensor devices and to individually regulate the temperature(s) of the three nonlinear crystals 3a-c.

A respective second beam splitter 11a-c, which is designed in the example shown as an optical filter, separates the respective pump laser beam 5a-c, more precisely its nonconverted radiation fraction, from a respective signal beam 7a-c. The three signal beams 7a-c may for example be superimposed in the manner described above in connection with FIG. 3 to form a single laser beam, having three different signal wavelengths $\lambda_{S1}$, $\lambda_{S2}$, $\lambda_{S3}$ in the visible wavelength region and being usable e.g. for visualization applications.

The production costs may be reduced for the laser light source 1 shown in FIG. 4, since as many components as possible are used in common for all three nonlinear crystals 3a-c, as is the case for example with the common superpositioning device 16 arranged in front of the three nonlinear crystals 3a-c. Since the nonconverted fraction of the pump laser beam 5 is not utilized in the parallel arrangement of the three nonlinear crystals 3a-c, the three nonlinear crystals 3a-c are arranged between two resonator end mirrors 23, 24, which form together with the nonlinear crystals 3a-c respectively an optical parametric oscillator, in order to minimize the power losses of the respective pump laser beam 5a-c.

In the examples described above, the seed light source 4, 4a-c is designed each time to generate a seed signal beam 7', 7'a-c. But of course, in place of the seed signal beam 7', 7'a-c, a seed idler beam (not depicted) can also be coupled into a respective nonlinear crystal 3, 3a-c in order to boost the amplification of the respective idler beam 8, 8a-c. At the above described pump wavelength of around 375 nm, however, the idler wavelength $\lambda_I$, $\lambda_{I1}$, $\lambda_{I2}$, $\lambda_{I3}$ of the idler beam 8, 8a-c generally lies in the infrared wavelength range, so that the idler beam 8, 8a-c cannot be used for visualization applications without a subsequent frequency conversion. But this does not preclude the use of the idler beam 8, 8a-c for other applications. It is likewise in principle possible to couple seed radiation at wavelengths other than the respective signal wavelength $\lambda_S$ or the idler wavelength $\lambda_I$ into the nonlinear crystal 3, 3a-c, yet this has practically no influence on the amplification of the signal beam 7, 7a-c or the idler beam 8, 8a-c in the respective nonlinear crystal 3, 3a-c.

Of course, in all of the examples described above it is possible to make the intensity of the seed signal beam 7', 7'a-c or the seed idler beam coupled into a respective nonlinear crystal 3, 3a-c adjustable with the help of a control device 22, in order to adjust in this way the coherence of the laser light or laser beam 33 generated by the respective laser light source 1. The adjusting of the coherence may be useful for example when using the laser light source 1 as an illumination source for the generation of holograms. The laser light sources 1 described above are suitable for miniaturization on account of the absence of mechanical functional components such as mechanical filters and they may be used for example as light sources for laser projectors, such as for head-up displays or the like.

While embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention may cover further embodiments with any combination of features from different embodiments described above and below. Additionally, statements made herein characterizing the disclosure and/or invention refer to an embodiment and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A laser light source comprising:
   a nonlinear optical medium,
   a pump laser source configured to generate a pump laser beam to form a signal beam and an idler beam in the nonlinear optical medium by parametric down conversion,
   a seed light source configured to generate a seed signal beam and/or a seed idler beam having a coherence length less than a coherence length of the pump laser beam,
   a superpositioning device configured to superposition the seed signal beam and/or the seed idler beam with the pump laser beam for joint coupling into the nonlinear optical medium, and
   a control device configured to adjust a power of the seed signal beam and/or of the seed idler beam so as to adjust the coherence length of the signal beam coupled out from the nonlinear optical medium.

2. The laser light source according to claim 1, wherein the coherence length of the signal beam decreases as the power of the seed signal beam and/or of the seed idler beam increases.

3. The laser light source according to claim 1, wherein the seed light source is one of an LED, a superluminescence diode, or a laser diode.

4. The laser light source according to claim 1, wherein, the pump laser source is configured to generate the pump laser beam with a pump wavelength of less than 460 nm.

5. The laser light source according to claim 1, wherein the pump laser source comprises a solid state laser.

6. The laser light source according to claim 1, further comprising: an optical isolator configured to protect the pump light source against back reflection.

7. The laser light source according to claim 1, wherein the nonlinear optical medium is arranged inside a resonator for a pump wavelength of the pump laser beam.

8. The laser light source according to claim 1, wherein the pump laser beam passes through the nonlinear optical medium in a single pass or in a double pass.

9. The laser light source according to claim 1, wherein the nonlinear optical medium comprises a waveguide.

10. The laser light source according to claim 9, further comprising a focusing device configured to focus the pump laser beam, the seed signal beam, and/or the seed idler beam on an entry surface of the waveguide.

11. The laser light source according to claim 1, wherein the nonlinear optical medium is periodically poled.

12. The laser light source according to claim 1, wherein the nonlinear optical medium is selected from the group consisting of: KTP, PP-KTP, $LiNbO_3$, PP-LN, Ti:LN, AlN, LNoI, BBO, and LBO.

13. The laser light source according to claim 1, further comprising: at least one beam splitter configured to separate the signal beam and/or the idler beam from the pump laser beam.

14. The laser light source according to claim 1, further comprising: a sensor device configured to measure an intensity of the signal beam and/or of the idler beam.

15. The laser light source according to claim 14, further comprising: a regulating device configured to regulate a temperature of the nonlinear optical medium and/or a power of the pump laser source in dependence on the intensity of the signal beam and/or of the idler beam measured by the sensor device.

16. The laser light source according to claim 1, further comprising at least one heating and/or cooling device configured to adjust a temperature of the nonlinear optical medium.

17. The laser light source according to claim 16, wherein the heating and/or cooling device forms a heating light source, which is designed for radiative heating of the nonlinear optical medium.

18. The laser light source according to claim 16, wherein the at least one heating and/or cooling device is in surface contact with the nonlinear optical medium.

19. The laser light source according to claim 1, further comprising a first nonlinear optical medium configured to form a first signal beam and a first idler beam by parametric down conversion, a second nonlinear medium to form a second signal beam and a second idler beam by parametric down conversion and a third nonlinear medium configured to form a third signal beam and a third idler beam by parametric down conversion.

20. The laser light source according to claim 19, which is designed to guide the pump laser beam from the pump laser source to the first nonlinear optical medium, to guide the pump laser beam emerging from the first nonlinear optical medium to the second nonlinear optical medium and to guide the pump laser beam emerging from the second nonlinear optical medium to the third nonlinear optical medium.

21. A laser projector, comprising a laser light source according to claim 1.

* * * * *